(12) United States Patent
Novet et al.

(10) Patent No.: US 6,783,418 B2
(45) Date of Patent: Aug. 31, 2004

(54) EMITTER WITH FILLED ZEOLITE EMISSION LAYER

(75) Inventors: Thomas Novet, Corvallis, OR (US); David M. Schut, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/758,801

(22) Filed: Jan. 15, 2004

(65) Prior Publication Data

US 2004/0147050 A1 Jul. 29, 2004

Related U.S. Application Data

(62) Division of application No. 10/126,426, filed on Apr. 18, 2002.

(51) Int. Cl.[7] .................................................. H01J 9/24
(52) U.S. Cl. ......................................................... 445/24
(58) Field of Search .............................. 445/24, 25, 50, 445/51; 313/309, 336, 351, 355; 257/10

(56) References Cited

U.S. PATENT DOCUMENTS

| | | |
|---|---|---|
| 4,923,421 A | 5/1990 | Brodie et al. |
| 5,142,184 A | 8/1992 | Kane |
| 5,374,844 A | 12/1994 | Moyer |
| 5,492,879 A | 2/1996 | Dye et al. |
| 5,507,676 A | 4/1996 | Taylor et al. |
| 5,528,103 A | 6/1996 | Spindt et al. |
| 5,557,596 A | 9/1996 | Gibson et al. |
| 5,559,342 A | 9/1996 | Tsukamoto et al. |
| 5,675,972 A | 10/1997 | Edelson |
| 5,760,417 A | 6/1998 | Watanabe et al. |
| 6,011,356 A | 1/2000 | Janning et al. |
| 6,023,124 A | 2/2000 | Chuman et al. |
| 6,033,924 A | 3/2000 | Pack et al. |
| 6,313,043 B1 | 11/2001 | Hattori |

FOREIGN PATENT DOCUMENTS

| | | |
|---|---|---|
| EP | 0896356 A1 | 2/1999 |
| EP | 0913850 A1 | 5/1999 |
| EP | 0989577 A2 | 5/2000 |
| WO | WO 01/80273 | 10/2001 |

OTHER PUBLICATIONS

Xiaotian Li et al, "BN and Si nanstructures: preparationa nd visible photoluminescence properties", Materials Letters 44 (2000) pp 341–346.

H. Miguez et al, "Low temperature synthesis of Ge nanocrystals in zeolite Y", Applied Phyisics Letters, 69(16), Oct 14, 1996, pp 2347–2349.

Steele, Mark R et al, "Topotactic Metal Organic Chemical Vapor Deposition inZeolite Y: Structure and Properties of CH3MY from MOCVD Reactions . . . ", J. Am. Chem. Soc., 1993, (115), pp 7285–7292.

Ozin, Geoffrey et 1, "Intrazeolite Topotactic MOCVD. 3–Dimensional Structure–Controlled Synthesis of II–VI Semiconductor Nanoclusters", Chem. Mater., 1994, (6), pp 999–1010.

Ozin, Geoffrey A, "Nanochemistry: Synthesis in Diminishing Dimensions", Adv. Mater, 1992, V.4 (10) pp 612–649.

Steele, Mark et al, "Stepwise Synthesis of II–VI Nanoclusters Inside Zeolite Y Supercages Using MOCVD Type Precursors", Proc. of 9th Int'l Zeolite Conf., M ntreal 1992, pp 185–192.

Ozin, Geoffrey et al, "Zeolates: A Coordination chemistry View of Metal–Ligand Bonding in Zeolite Guest–Host Inclusion Compounds", J. Phys. Che, 1986, (90), pp 511–521.

*Primary Examiner*—Joseph Williams (57) ABSTRACT

An emitter includes an electron supply layer, a dielectric layer on the electron supply layer defining an emission area, and a filled zeolite emission layer within the defined emission area and in contact with the electron supply layer. The filled zeolite emission layer holds a semiconductor material within the cage of the zeolite.

7 Claims, 6 Drawing Sheets

EMITTER WITH FILLED ZEOLITE EMISSION LAYER

This application is a divisional of application Ser. No. 10/126,426, filed Apr. 18, 2002 which is herein incorporated by reference.

FIELD OF THE INVENTION

The invention is in the microelectronics field. The invention particularly concerns electron emitters, electron array emitters and devices incorporating these types of emitters.

BACKGROUND OF THE INVENTION

Electron emitters have a wide range of potential applicability in the microelectronics field. The controlled emissions form a basis to create a range of useful electrical and optoelectrical effects. Prior conventional emitters include spindt tip cold cathode devices, MIS (metal-insulator-semiconductor), MOS (metal-oxide-semiconductor) and MIM (metal-insulator-metal) flat emitters.

Challenges presented by spindt tip emitters include manufacturability and stability, both temporal and spatial. Emission from these devices depends upon field strength at the tip and the work function of the material making up the tip. Slight imperfections in the tip shape, topology, or surface contamination can have large effects in emission density, stability, and emitter lifetime.

Manufacturing large numbers of identical tips at the Angstrom level is difficult. Once a tip is formed it can change over the lifetime of its operation. If not operated in high vacuum conditions, emitted electrons can ionize gaseous atoms. The ionized contaminants are attracted to the spindt tip and collide with it, thereby causing damage. This damage causes a change in the topology of the surface and the tip of the emitter as well as possibly changing the composition of the material such that a change in emission current, stability, or lifetime can be seen.

Traditional flat emitters are comparably advantageous because they present a larger emission surface that can be operated in less stringent vacuum environments. (Flat emitters typically include a dielectric emission layer that responds to an electrical field created by a potential applied between an electron source and a thin metal cathode on either side of a dielectric layer.) There are many theories and proposals as to the true mechanism of emission for these devices, but the basic premise is that electrons tunnel from the junction of the source and dielectric to the conduction band of the dielectric somewhere in the dielectric layer. Once in the conduction band, the electrons are ballistically accelerated towards the thin metal cathode. The electrons then tunnel through the thin metal cathode and exit the emitter.

Drawbacks to the use of these traditional flat emitters (MIS, MOS and MIM) include lifetime stability, spatial resolution and low efficiency. The lifetime stability of these devices depends highly upon the thickness of the dielectric. The thicker the dielectric, the better the lifetime of these devices can be due to the robustness of the dielectric layer. On the other hand, thicker dielectric materials lowers the efficiency of an already inefficient material-reducing the amount of beam current that can be extracted from these devices. Finally, spatial resolution is decreased for these materials due to collisions of the electrons with atoms while passing through the insulator layer and the thin metal electrode layer. This disrupts chemical bonds (reducing lifetime) and scatters the electrons reducing the ease with which they may be focused.

SUMMARY OF THE INVENTION

An emitter includes an electron supply layer, a dielectric layer on the electron supply layer defining an emission area, and a filled zeolite emission layer within the defined emission area and in contact with the electron supply layer. The filled zeolite emission layer holds a semiconductor material within the cage of the zeolite.

DETAILED DESCRIPTION OF THE INVENTION

The present invention concerns an emitter including a filled zeolite emission layer. The emission layer is formed on an electron source such as silicon or polysilicon substrate in an area defined by an insulator such as field oxide or silicon nitride. Portions of a zeolite structure are filled with a semiconductor material to produce a quantum dot structure. A preferred vapor deposition process used in forming devices, including an emission layer according to the invention, produces self-assembling material of high stability. Pore sizes of particular zeolites are well defined and are easily controlled during manufacture, leading to emitters that are highly reproducible.

The invention will now be illustrated with respect to a preferred embodiment emitter and representative devices incorporating the preferred embodiment emitter. In describing the invention, particular exemplary devices, formation processes, and device applications will be used for purposes of illustration. Dimensions and illustrated devices may be exaggerated for purposes of illustration and understanding of the invention. A single emitter illustrated in conventional fashion by a two-dimension schematic layer structure will be understood by artisans to provide teaching of three-dimensional emitter structures. The teachings of the invention area readily incorporated into conventional integrated circuit formation processes, as will also be appreciated by artisans.

Figure 1:
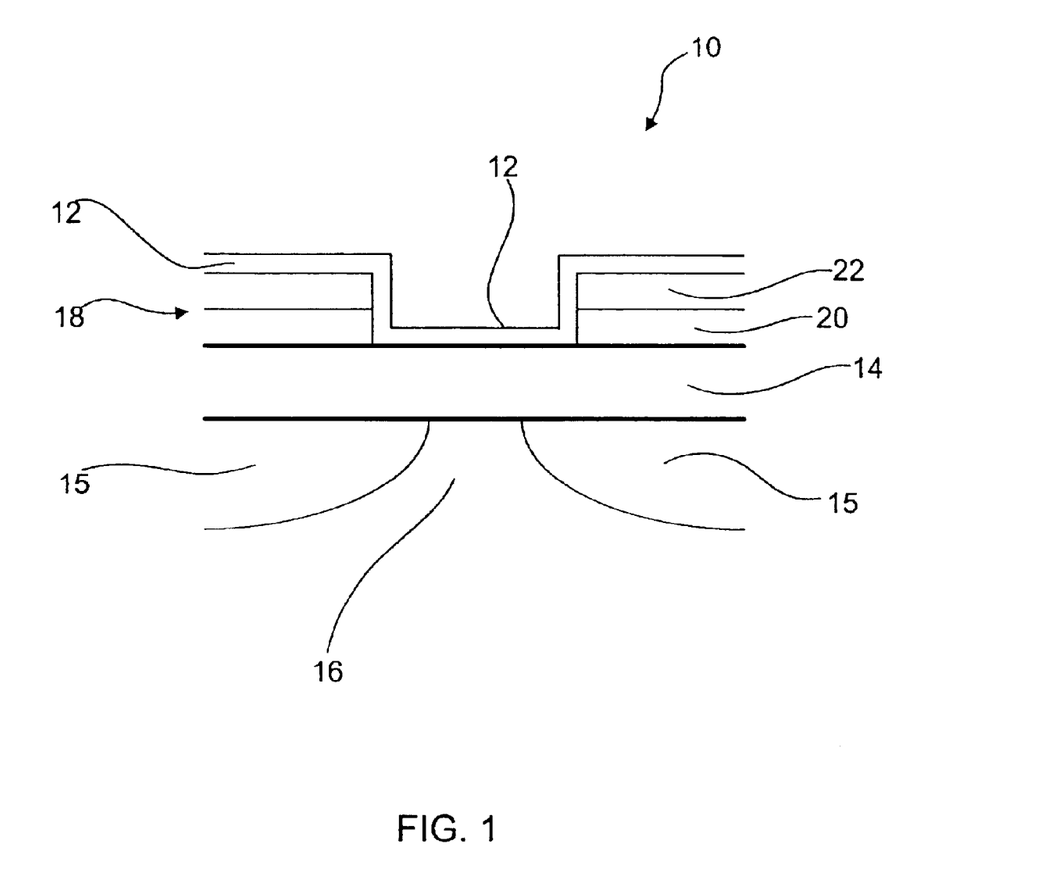
FIG. 1 is a schematic representation of a preferred embodiment emitter the invention.

Referring now to FIG. 1, a preferred embodiment emitter 10 of the invention is shown in a two-dimensional schematic cross section. The preferred embodiment emitter 10 is an metal insulator semiconductor (MIS) device including a flat emission area defined by a thin metal layer 12 formed over a filled zeolite emission layer 14. The emission layer 14 is formed in an area defined by a dielectric layer 15, e.g., a field oxide. A n++ Si substrate 16 serves as the electron supply source for the emitter 10. A field stimulates electron emission through the filled zeolite emission layer 14 when an appropriate voltage is supplied to a metal contact structure 18. In the emitter 10, the metal contact structure 18 is shown in a preferred form as a multilayer contact of Au and Ta. The separate layers 20 and 22 may, for example, form part of a circuit interconnect pattern in an integrated circuit into which the emitter 10 is incorporated. Application of a voltage to the metal contact structure 18 establishes an electric field between the substrate 16 and the thin metal layer 12, which acts as a cathode.

Zeolites are highly structured crystalline nanostructures with long-range crystalline order. Conventional zeolites are aluminosilicates, but zeolite chemistry now extends to aluminophosphates, gallosilicates, gallophosphates, and borosilicates. The preferred embodiment has a zeolite layer of aluminosilicate. Aluminosilicate molecules are based on $TO_4$ tetrahedra, where T is an aluminum or silicon atom. All four corners of the tetrahedron are shared, creating vast three-dimensional networks. Depending primarily on the silicon to aluminum ratio, the tetrahedrons form a variety of secondary building units ("SBUs") containing up to 16 atoms. The SBUs then combine in chains and layers having holes or cages and/or channels that are large enough for atoms, cations or molecules to fit inside. Zeolite molecules are self-assembling, and the size of the cages or channels is determined by the SBUs and how they fit together. Whether cages, supercages, or channels are formed, they are referred to as 'cages' for the purposes of this discussion. Any cages of the appropriate size and spacing are appropriate for use in the quantum dot emission layer, regardless of the geometry of the void.

A number of zeolites are suitable for use as a filled electron emission layer. Inherently, zeolites are insulators. Faujasite type structures are preferred zeolites for use in the electron emission layer. Zeolite Y is the most preferred zeolite. While not wishing to be bound by theory, it is believed that electrons move within the zeolite by one of two mechanisms, depending on the structure and orientation of the zeolite. Any zeolite is contemplated for use with this invention that allows movement of electrons through the zeolite structure, regardless of the actual mechanism.

If a zeolite of C-axis normal orientation is used, it is believed that the electrons flow by moving from one cage to another. Quantum tunneling is a likely method of movement between cages. If the cages are appropriately spaced, electrons are able to move from one cage to another, creating an electron flow along a row of cages. The cages are ideally spaced when they are about 10 Å apart. Spacing between the cages in a preferred embodiment of the emitter is from about 10 Å to about 50 Å, with the current decreasing as cage spacing increases. Because of the size of these cages, the fact that they act as dielectric materials, enables these devices to be considered as three-dimensional quantum dot structures in which the filling material acts as the quantum dot. The zeolite chosen for use in the quantum dot emission layer 14 preferably has cage spacing of about 5 Å to about 15 Å and more preferably about 10 Å to about 15 Å.

The nature of the emissions and required operational conditions to produce emissions will depend upon the thickness of the filled zeolite emission layer 14. A preferred emission layer is a filled zeolite layer in the approximate range of 0.05 to 0.50 micrometers thick. Designers applying the invention will understand that thinner layers reduce the tunneling resistance of the layer (as applied to device design 1) and produce emissions at lower voltages. However, a point is reached when the layer becomes too thin and dielectric breakdown is possible. The lower limit for thinness is also affected by the dielectric strength of the material. The filled zeolite emission layers of the invention are stable, high quality dielectrics. Thinner layers may be found to produce sound dielectrics. Designers will also understand that an optimized thickness produces maximum emission efficiency. If the filled zeolite emission layer is too thin, high leakage current and electric shorting are possible, while if it is too thick, the emission current will be greatly reduced. Increasing the thickness of the quantum dot emission layer 14 will increase its tunneling resistance. At a certain point, the tunneling resistance will be larger than desirable. The ultimate upper thickness limit, though, is also application specific. A willingness to allow higher voltages will permit the use of thicker layers. In sum, when lower voltages are critical, thinner layers produce emissions at lower voltages. When higher voltages are permissible, thicker layers produce increased emissions.

The thin metal layer 12 is formed of a metal or alloy and in a thickness to provide sufficient electric field strength. On the other hand, the thickness is limited to permit electron and photon emissions to escape from the quantum dot emission layer 14. A preferred thin metal layer 12 is a Pt layer of approximately 25–50 Å. Alternate materials are Au, Ta, and combinations of Pt, Au or Ta. In addition to Pt, Au, Ta, other metals include Mo, Ir, Ru, Cr or other refractory metals and alloys may be used. Similar possibilities exist for the metal contact structure 18.

The advantage of this system is that regular three-dimensional quantum dot structures can be synthesized with tremendous control and the cage size varied to adjust the electrical properties and emission properties accordingly. Additionally, by using regular step functions for the quantum dot structure—a cascade effect can be produced, increasing the tunneling of the electrons through the emission layer and increasing the resultant efficiency of the electron emitter as compared to traditional flat electron emitters.

The second mechanism is believed to apply when the channels are oriented approximately perpendicular to the substrate layer in an ortho-normal orientation. Semiconductor material is then deposited inside the channel forming miniature tips isolated from each other by the zeolite structure. Again, because of the size of the cages formed and the fact that the zeolite acts as an insulating material, these structures may be considered two-dimensional quantum dot structures in which emission occurs along the C-axis of the semiconductor material placed inside the zeolite channel. Emission is enhanced with this structure because the electric field lines are strengthened around the 'tip' structure of the embedded semiconductor material. This is due to the fact that the zeolite dielectric material has a regular spacing of these two-dimensional quantum dot structures.

The preferred thickness for these two-dimensional quantum dot structures is a filled zeolite layer in the approximate range of 0.05 to 0.50 micrometers in thickness. The thickness of the film should not change the resultant properties of the emitter tremendously, thus the width of the cage (as discussed earlier) can have vast effects upon the properties of these buried emitters. After deposition and filling of the zeolite layer, two approaches may be taken to produce the extracting layer. The first would be to establish an extracting 'gate' of material in which the gate has no physical contact with the semiconductor filled zeolite cages. The electric field generated by this extracting gate would be enhanced around the tip structure causing electron beam emission. The second approach would be to add an insulating material on top of the filled zeolite layer with a thin metal then placed over the dielectric. Designers applying this invention will understand that thinner layers of dielectric reduce the tunneling resistance of the buried tip and produce emissions at lower voltages. However, a point can be reached where the layer becomes too thin and dielectric breakdown can occur. The lower limit of this thickness is affected by the dielectric strength of the material in question. With high quality dielectric materials, thin layers may be found to produce excellent buried emitters. With lower quality dielectric materials, a thicker layer is needed to reduce leakage current from the filled zeolite layer to the metal extracting gate.

The metal layer used in the first approach is formed of a metal or alloy and has a bias applied to it to provide sufficient electric field strength. A preferred metal layer is a Pt layer of approximately 50–500 nm thickness. Alternate materials include Au, Ta, Mo, Ir, Ru, Cr or other refractive metals and alloys of these metals.

The metal layer used in the second approach is formed of a metal or alloy and in a thickness to provide sufficient electric field strength. On the one hand, the thickness is limited to permit electron and photo emissions to escape from the buried emitter tip layer. A preferred thin metal layer is a Pt layer of approximately 25 to 50 Å. Alternate materials include Au, Ta, Mo, Ir, Ru, Cr or other refractive metals and alloys of these metals.

The advantage of this structure is the creation of regular sized tips that can be used in a field array device. This structure will have increased efficiency as compared to flat electron emitter devices, and will be much more stable than the spindt tips since they are embedded within a dielectric material and covered with a thin metal. By embedding the material in a dielectric, the efficiency will be increased, and covering by a top metal layer will offer increased protection from ionized contaminants that may be within the device itself.

The cages should be as large as practical while retaining the appropriate spacing between cages. The zeolite chosen must have a sufficient cage diameter to accommodate semiconductor materials within the cages. In a preferred embodiment, about 10 to about 15 atoms of silicon or germanium are held within the interior of the cage. Any semiconductor materials are preferred guest molecules within the cages of the zeolite. Any non-metallic material with a small band gap is suitable as a guest molecule. As the molecules become large compared to the size of the cage, steric hindrance makes it difficult to control deposition within the cages.

Figure 2:
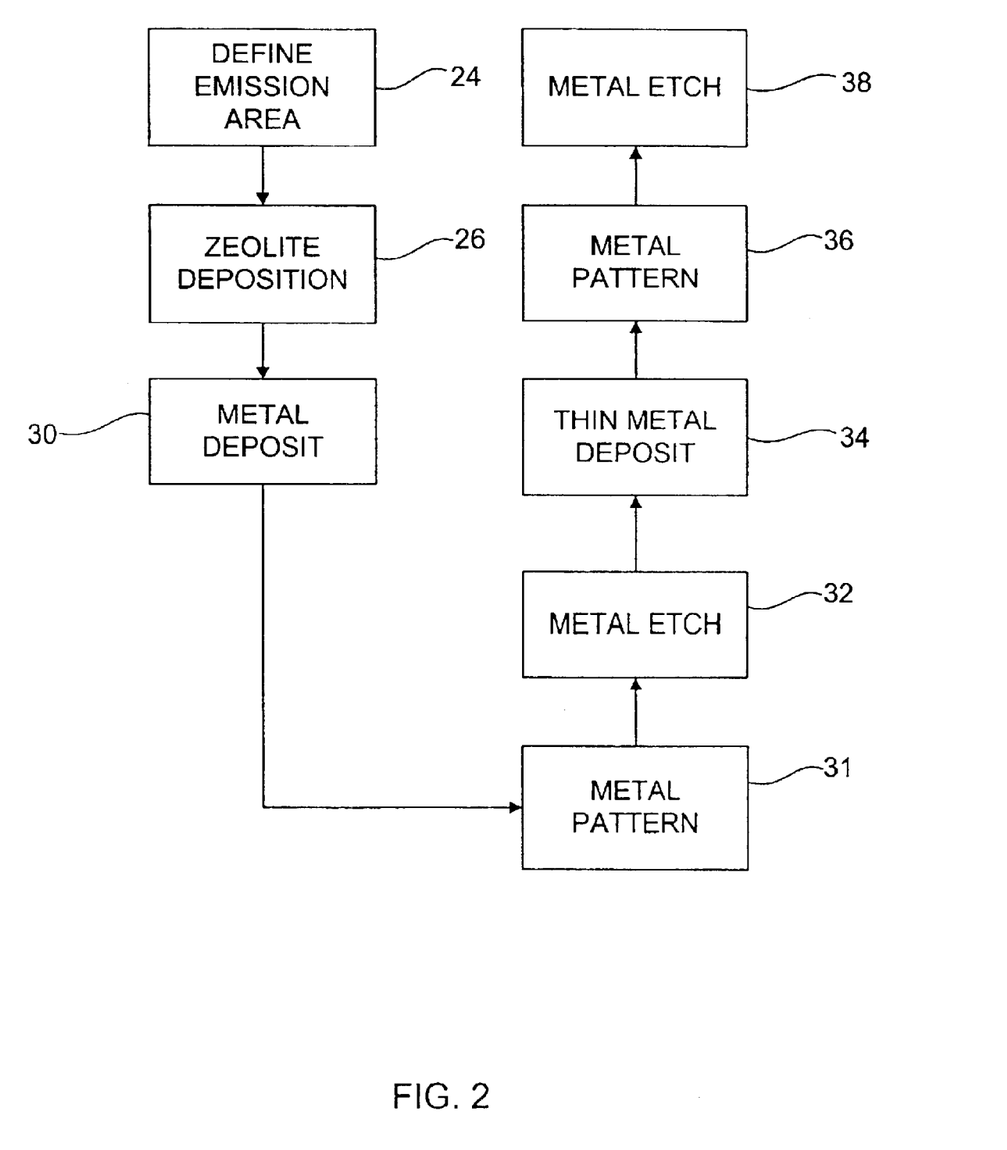
FIG. 2 is a block diagram of a preferred embodiment emitter formation process usable to form the exemplary preferred embodiment emitter of FIG. 1.

Emitters 10 of the invention are preferably formed with metal organic chemical vapor deposition process that is amenable to the incorporation of the invention into circuits and integrated circuit device applications. Those skilled in the art will recognize other appropriate deposition processes, such as wet chemistry. FIG. 2 is a block diagram showing the steps of a preferred embodiment method of the invention. The process steps of FIG. 2 begin with an appropriate silicon or polysilicon substrate, e.g., a n++ doped silicon wafer. The process steps, while discussed with respect to a single device may be carried out for the simultaneous production of one or many devices. Artisans will also appreciate that the steps of FIG. 2 illustrate significant steps of the preferred process, and ancillary processes may be carried out in practice along with the steps illustrated in FIG. 2.

In step 24, a dielectric such as an oxide is used to define an emission area. The oxide serves to isolate the emission area from other devices. The manner of forming and patterning the oxide is a matter of design choice. Once the emission area is formed, in step 26, a chemical vapor deposition process is used to form the zeolite layer with embedded semiconductor material therein. A quantum dot emission layer may be formed as a single layer of zeolite. Alternatively, quantum dot emission layers may also be formed as multiple layers where successive layers have the same or a different zeolite. The quantum dot emission layer of the invention formed by chemical vapor deposition produces a high quality layer, whose crystal structure is excellent and stable. No ancillary step is required in the formation of the quantum dot emission layer; e.g., there is no need for annealing. Metal contact structures are then formed. For example, a metal deposition step 30 is followed by a metal pattern step 31 and a metal etch step 32. Optionally, there may be additional metal layers formed by similar steps after isolation steps, as in well-known processes for forming multiple layers of metal interconnect patterns in an integrated circuit. The thin metal cathode is formed, for example, by a deposition step 34 with an isolation photo patterning step 36 and metal etch step 38 to pattern the thin metal.

As mentioned, potential uses of an emitter according to the invention, such as the emitter 10 of FIG. 1 are wide-ranging due to the general utility of electron emission as a basis for electrical and electrooptical effects. Further, emitters of the invention are easily incorporated into integrated circuit fabrication techniques. A few preferred applications of the emitter will now be discussed.

Figure 3:
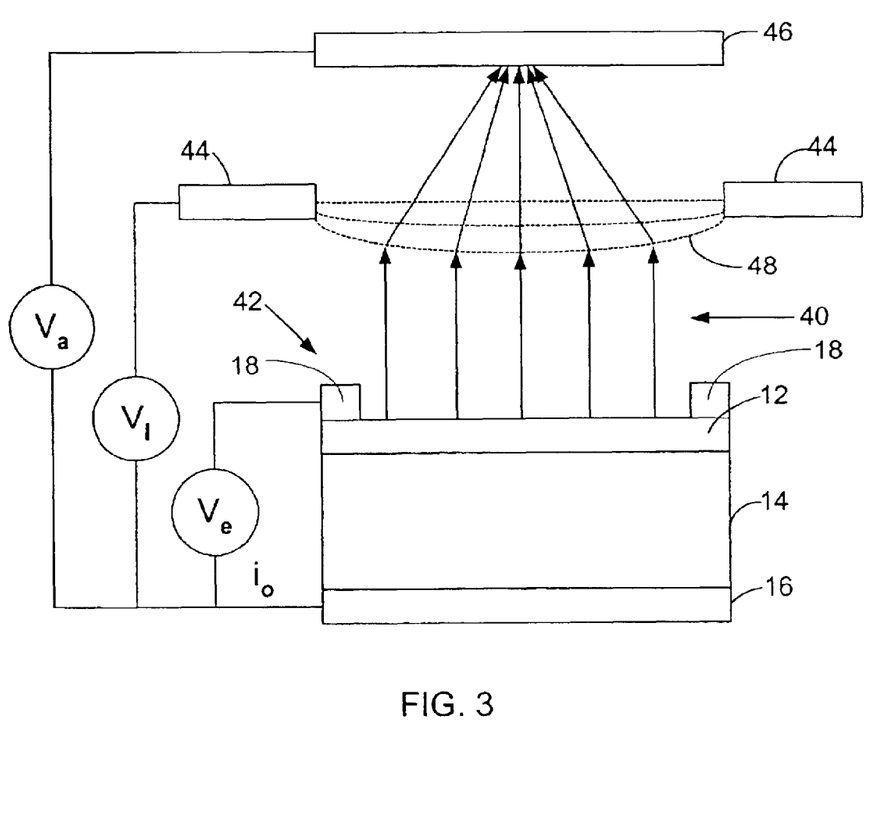
FIG. 3 is a block diagram of a preferred embodiment device having an emitter and a target medium.

FIG. 3 is an exemplary diagram of a preferred application of an emitter where a target medium receives focused emissions. In this application, the emissions 40 from an emitter 42 of the invention are focused by an electrostatic focusing device or lens 44, exemplified as an aperture in a conductor that is set at a predetermined voltage that can be adjusted to change the focusing effect of the lens 44. Those skilled in the art will appreciate that lens 44 can be made from more than one conductor layer to create a desired focusing effect. The emissions 40 are focused by the lens 44 into a focused beam onto a target anode medium 46, which might be a memory or display medium, for example. The anode medium is set at an anode voltage $V_a$. The magnitude of $V_a$ will depend on the intended use and the distance from the anode medium 46 to the emitter 42. For example, with the anode medium being a recordable medium for a storage device, $V_a$ might be chosen to be between 500 and 1000 Volts. The lens 44 focuses the electron emission 40 by forming an electric field 48 in response to voltage $V_l$ within its aperture. By being set at a proper voltage difference from $V_e$, the electrons emitted from the emitter 42 are directed to the center of the aperture and then further attracted to the anode medium 46 to form the focused beam.

In another preferred embodiment, the anode medium 46 is a display medium. The focusing of the beam onto the anode medium then produces an effect to stimulate a visual display.

Figure 4:
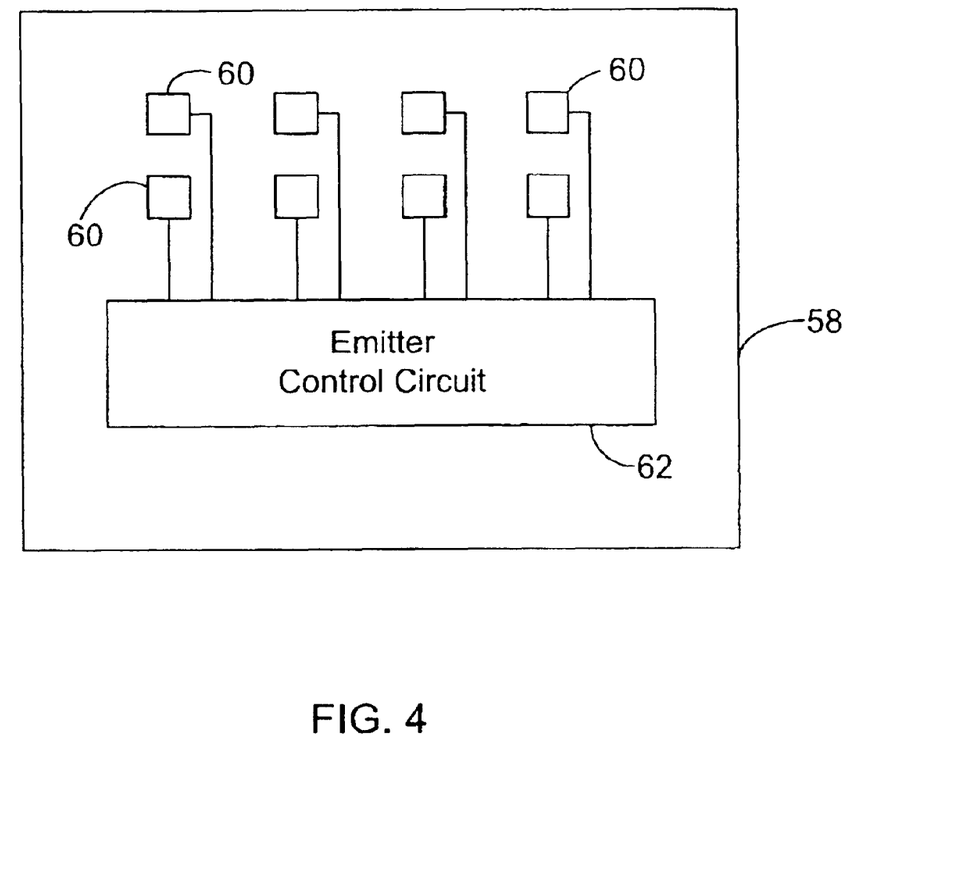
FIG. 4 is a block diagram of a preferred embodiment integrated circuit.

FIG. 4 is an exemplary embodiment of an integrated circuit 58 that includes at least one integrated emitter 60, but preferably a plurality of integrated emitters 60 arranged in an array. An emitter control circuit 62 is integrated onto the integrated circuit 58 and used to operate the at least one integrated emitter 60. Emitters 60 of the invention are thus incorporated into an integrated circuit, which is possible by virtue of the nature of the present quantum dot emission layer.

Figure 5:
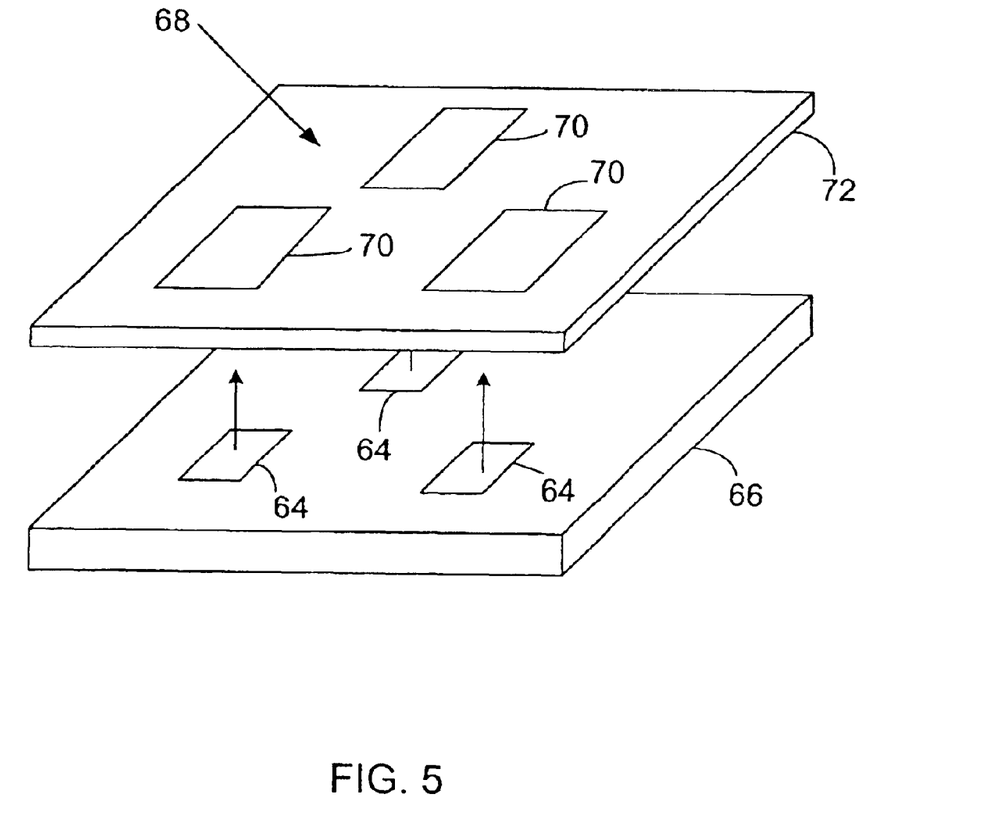
FIG. 5 is a block diagram of an alternative preferred embodiment display.

FIG. 5 is another alternative embodiment of a display application using an integrated emitter 64 of the invention. In this embodiment, a plurality of emitters 64 is formed in an integrated circuit 66. Each of the emitters 64 emits electrons. An anode structure 68 having multiple pixels 70 forming a display 72 receives the emitted energy. The pixels 70 are preferably a phosphor material that creates photons when struck by emissions from emitters 64. The emitter 64 shown in FIG. 3 is an example of an emitter suitable for use in the display device of FIG. 5. Optionally, there is a coating on the lens 44 to capture electrons from the emitter 64.

Figures 6A, 6B:
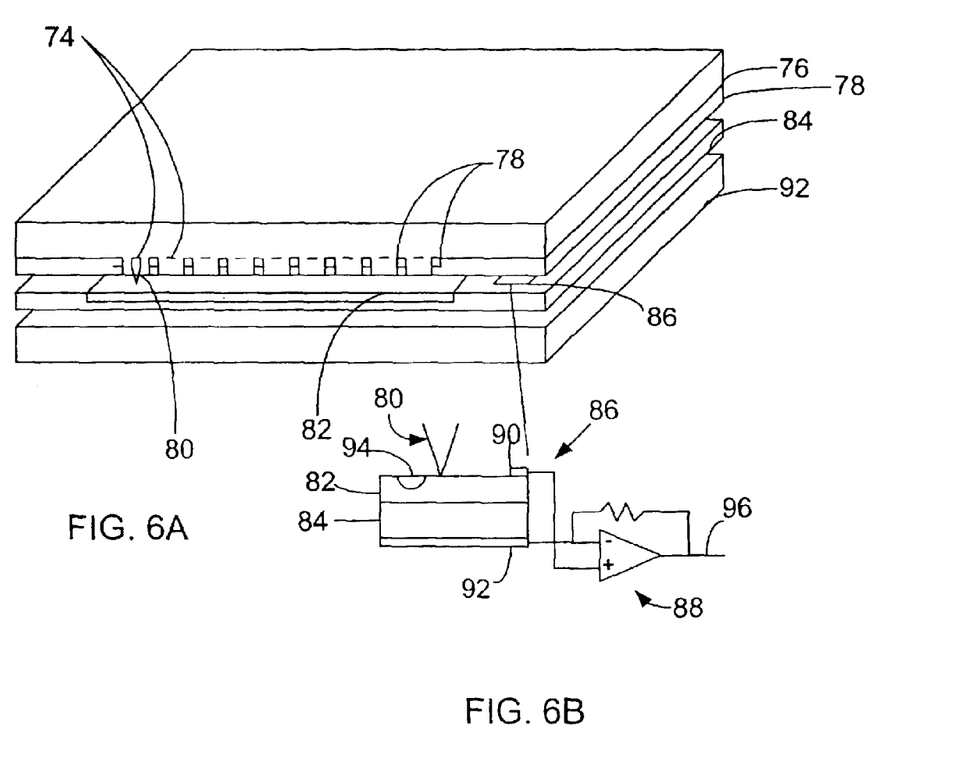
FIGS. 6A and 6B illustrate a preferred embodiment memory device.

A particular preferred memory device is shown in FIGS. 6A and 6B. The memory device includes integrated emitters 74. In this exemplary embodiment, an integrated circuit (IC) 76 including a plurality of integrated emitters 74 has a lens array 78 of focusing mechanisms aligned with the integrated emitters 74. The lens array 78 is used to create a focused beam 80 that is used to affect a recording surface, media 82. Media 82 is applied to a mover 84 that positions the media 82 with respect to the integrated emitters 74 on IC 76. Preferably, the mover 84 has a reader circuit 86 integrated within. The reader 86 is shown as an amplifier 88 making a first ohmic contact 90 to media 82 and a second ohmic contact 92 to mover 84, preferably a semiconductor or conductor substrate. When a focused beam 80 strikes the media 82, if the current density of the focused beam is high enough, the media is phase-changed to create an affected media area 94. When a low current density focused beam 80 is applied to the media 82 surface, different rates of current flow are detected by amplifier 88 to create reader output 96. Thus, by affecting the media 82 with the energy from the emitter 74, information is stored in the media using structural phase changed properties of the media. An exemplary phase-change material is $In_2Se_3$. Other phase change materials are known to those skilled in the art.

While a specific embodiment of the present invention has been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

We claim:

1. A method for forming an emitter, comprising the steps of:

forming a patterned oxide layer to define an emission area upon an electron supply layer; and forming a quantum dot zeolite emission layer comprising a plurality of cages and having semiconductor materials held within said cages.

2. The method of claim 1, further comprising a step of forming a metal contact structure on the pattered oxide layer.

3. The method of claim 2, further comprising a step of forming a thin metal layer on the quantum dot zeolite emission layer and the metal contact structure.

4. The method of claim 2, wherein the metal contact structure comprises a single metal layer.

5. The method of claim 2, wherein the metal contact structure comprises multiple metal layers.

6. The method of claim 1, wherein said step of forming an quantum dot zeolite emission layer comprises forming a zeolite layer having a thickness in the approximate range of 0.05–0.5 micrometers.

7. The method of claim 1, performed as part of an integrated circuit formation process to form the emitter as part of an integrated circuit including emitter control circuitry.

* * * * *